(12) United States Patent
Andros

(10) Patent No.: US 6,634,162 B1
(45) Date of Patent: Oct. 21, 2003

(54) SIMULTANEOUS PROCESSING OF MULTIPLE ROWS OF PLANTS, ESPECIALLY TRELLISED ROWS

(76) Inventor: Matt Andros, 4285 Secondwind Way, Paso Robles, CA (US) 93446

( * ) Notice: Subject to any disclaimer, the term of this patent is extended or adjusted under 35 U.S.C. 154(b) by 0 days.

(21) Appl. No.: 10/175,551

(22) Filed: Jun. 17, 2002

(51) Int. Cl.[7] .............................................. A01D 46/00
(52) U.S. Cl. .................................................. 56/328.1
(58) Field of Search ........................... 56/327.1, 328.1, 56/329, 330; 180/900

(56) References Cited

U.S. PATENT DOCUMENTS

| | | | | |
|---|---|---|---|---|
| 3,405,515 A | * | 10/1968 | Dittmer | 56/328.1 |
| 3,421,304 A | * | 1/1969 | Phillips, Jr. | 56/328.1 |
| 3,483,687 A | * | 12/1969 | Tanner, Jr. | 56/328.1 |
| 3,527,039 A | * | 9/1970 | Recker | 56/328.1 |
| 3,561,205 A | * | 2/1971 | Baker | 56/328.1 |
| 3,992,861 A | * | 11/1976 | Edwards | 56/328.1 |
| 4,164,985 A | * | 8/1979 | Bobard | 180/53.1 |
| 4,179,871 A | * | 12/1979 | Claxton | 56/330 |
| 4,198,801 A | * | 4/1980 | Claxton | 56/1 |
| 4,321,786 A | * | 3/1982 | Burton | 56/330 |
| 4,683,969 A | * | 8/1987 | Littau | 180/6.48 |
| 5,642,610 A | * | 7/1997 | Dupon et al. | 56/340.1 |
| 6,378,282 B1 | * | 4/2002 | Carlton | 56/330 |

FOREIGN PATENT DOCUMENTS

| | | | |
|---|---|---|---|
| FR | 2604140 A1 | * | 3/1988 |
| FR | 2607091 A1 | * | 3/1988 |
| FR | 2700915 A1 | * | 8/1994 |
| FR | 2727820 A1 | * | 6/1996 |
| FR | 2823174 A1 | * | 10/2002 |

* cited by examiner

*Primary Examiner*—Robert E. Pezzuto
*Assistant Examiner*—Nathan Mammen
(74) *Attorney, Agent, or Firm*—Donald D. Mon

(57) ABSTRACT

The simultaneous processing of multiple rows of plants, especially trellised rows. Apparatus is provided to process two adjacent rows, using a conventional tractor with narrow gauge front wheels, with rear wheels on opposite sides of the two rows with a larger gauge. The spacing apart of the rear wheels is adjustable. The two processing apparati can be used simultaneously or selectively.

15 Claims, 4 Drawing Sheets

SIMULTANEOUS PROCESSING OF MULTIPLE ROWS OF PLANTS, ESPECIALLY TRELLISED ROWS

FIELD OF THE INVENTION

Simultaneous processing of a plurality of rows of plants, especially trellised rows, for example pruning and harvesting, and apparatus for the process.

BACKGROUND OF THE INVENTION

While this invention is useful with many types of plants and crops that are grown in rows, its presently most important application is for the processing of grape vines. The most modern system for establishing and maintaining vineyards is to provide trellises for the vines. The trellis itself includes a series of upright metal posts set in a row. Trellis wires are stretched between and attached to these posts. Usually four or more of these trellis wires are disposed about a foot above or below from one another, extending parallel to the ground, and attached to the posts by fasteners.

When the vine is first planted, some of its branches are attached to the lowermost wire, and the owner awaits the passage of time. During this time, the lower branches will grow and be trained to establish the cordon, which extends laterally in both directions from the root. Shoots from the cordon extend in many directions including upwardly from it. Only some of them will be selected to form part of the ultimate vine.

Seasonally, workers are brought into the vineyard to train the vines to grow upwardly in a proper pattern. Suitable shoots are selected and trained along the next wire above in order ultimately to provide a trellised vine which covers much of the face of the trellis. However, it is not that simple.

Each year the new growth is much in excess of that which is needed for the next wire, as to the number of shoots, their individual length, and their direction. The conventional way to attend to this is to send a large number of workers into the vineyard to prune the vines, to select the suitable shoots for further growth, to prune off the others, and to train the selected shoots along the next wire. The same thing is repeated again next season.

This technique is surprisingly expensive. The worker must cut (prune) every shoot to some length. Each cut takes time and human effort. In older vineyard systems which do not train their vines in the more modern technique, this is an accepted expense. However, labor has become much more expensive than it was before, and intensive labor expense is no longer tolerable, except for vineyards that produce extraordinary grapes.

Along with the ever-increasing producing acreage of vineyards, grape prices have fallen steeply, sometimes from as high as $2,000.00 per ton to as low as $400.00 per ton for grapes from the same vineyard. It is obvious that labor costs must be reduced, because they have become the major operating expense in vineyard operation. For vineyards of many acres, any labor saving quickly becomes very important.

Apparatus is known for mechanically pruning trellised plants and for harvesting the crop. Such equipment generally is bulky and heavy and is mounted on tractors which must be narrow enough to pass between rows. Rows are usually spaced between about 4 to about 6 feet on centers, so the tractor itself must be rather narrow. The tool is carried by an arm pivotally mounted to the tractor so the tool can be positioned appropriately. This becomes part of a top heavy structure because it must often overhang an adjacent row.

It is informative to note that both sides of a single row are usually engaged by the tool. The tool and its supporting arm exert both a sidewise-tilting and forward-leaning force on a narrow tractor. As a consequence, the tool and tractor can be dangerous to its driver. For example while turning around at the end of a row, the tool adds a tilting centrifugal torque on the tractor. Especially when there is a slope at the end of the row, there is a considerable risk of overturning a narrow gauge vehicle while turning it.

One way to resist the tip-over risk is to provide a wider wheel base (tread, gauge), but the narrow width of the path between adjacent rows precludes this if the driver is to remain seated at a lower elevation. It is, of course, possible to raise the operator above the rows and have the tractor straddle the row. However the apparatus then becomes even more top-heavy, and raises the operator above the trellises where his ability to observe and respond to trellis conditions is compromised.

One can reasonably believe that a doubling of the number of working tools would provide some balance—a tool on each side of the tractor instead of only one on one side. The problem then becomes one of balance and control over two heavy tools and arms mounted to a tractor with a narrow wheel base. These are very considerable problems, and have been considered to be so serious that development of multiple row processing has essentially stopped.

For these and for reasons further to be discussed, apparatus to process two rows simultaneously has not been suitably developed despite its potential advantages. The advantages of having a tool operator process two rows simultaneously rather than one are not fully appreciated. Among the advantages is that only one pass is required for processing two rows instead of processing only one for each of the two rows. The simplistic notion is that production should double, because the operator does two identical things at once instead of only one. Surprisingly, the advantage is closer to three to one. The additional improvement in efficiency is related to human factors, as well as to mechanical ones, and is sufficient to encourage the investment in costlier machinery to process two rows at the same time.

While the time to travel the length of a row is the same when two rows are treated instead of one, there is only one turnaround for every two rows. While the time saving is less than half, it is still significant.

Then there are human factors. Suppose that two single row machines are operating in a vineyard. One breaks down. What does the other operator do? He turns off his own machine, stops, and goes over to help his friend get the other machine started again. Two machines are down, not just one.

Or at coffee break. A man alone in a vineyard will stop for a brief time for coffee when he has no one to talk with. If there are two men, they visit. Time is lost. There are other factors, but these illustrate the advantages of expanding the capacity of a given machine while reducing the number of workers in the vineyard.

It is an object of this invention to provide apparatus simultaneously to process both sides of two adjacent trellised rows, utilizing a tractor whose operator sits on a tractor chassis, at a conventional height between the rows. The steerable front part of the chassis has a width no larger than the row spacing. The rear end of the tractor has a rear wheel base width (gauge) that is much wider than the path between the rows. In fact, the rear wheels run on the opposite sides of the adjacent rows. Such structure does not impede the operator's view and enables the use of the tractor's conventional power and drive control systems to be used.

All of the advantages of the conventional tractor remain available in a structure less likely to tip over, and which can process multiple rows at the same time.

BRIEF DESCRIPTION OF THE INVENTION

Apparatus simultaneously to process a plurality of trellised crop rows according to this invention includes a tractor chassis that includes a power source such an internal combustion engine, a power take-off, a pair of steerable front wheels with a first lateral gauge, means to mount a driver, controls for the power source, and steering controls for the steerable wheels. The tractor has a width and the gauge of said front wheels is small enough to move along a central path between a pair of adjacent rows to be processed. These rows bound the central path on each side.

A bridge is mounted to the rear of the chassis. It extends laterally from and above the chassis. Two struts depend from the bridge. Each strut mounts a rear wheel. The rear wheels are laterally spaced by a larger, second gauge. This second gauge is sufficiently wider than said first gauge so that said rear wheels can move in parallel adjacent paths on the opposite side of the rows which are adjacent to said central path.

A drive train interconnects the power take-off to the rear wheels. The two front and two rear wheels support the tractor. The front wheels steer it and support the front end of the tractor. The rear wheels complete the support of the apparatus and drive the apparatus.

According to a preferred but optional feature of the invention, the bridge includes means to adjust the second gauge, that is, the spacing between the rear wheels. This enables the apparatus to be utilized for processing rows of different spacings.

According to yet another preferred but optional feature of the invention, working tools such as pruners are mounted to the bridge by manipulators which can control the position of the working tools relative to the chassis and its drives, all under control of the driver.

The above and other features of this invention will be fully understood from the following detailed description and the accompanying drawings, in which:

DETAILED DESCRIPTION OF THE INVENTION

Figure 2:
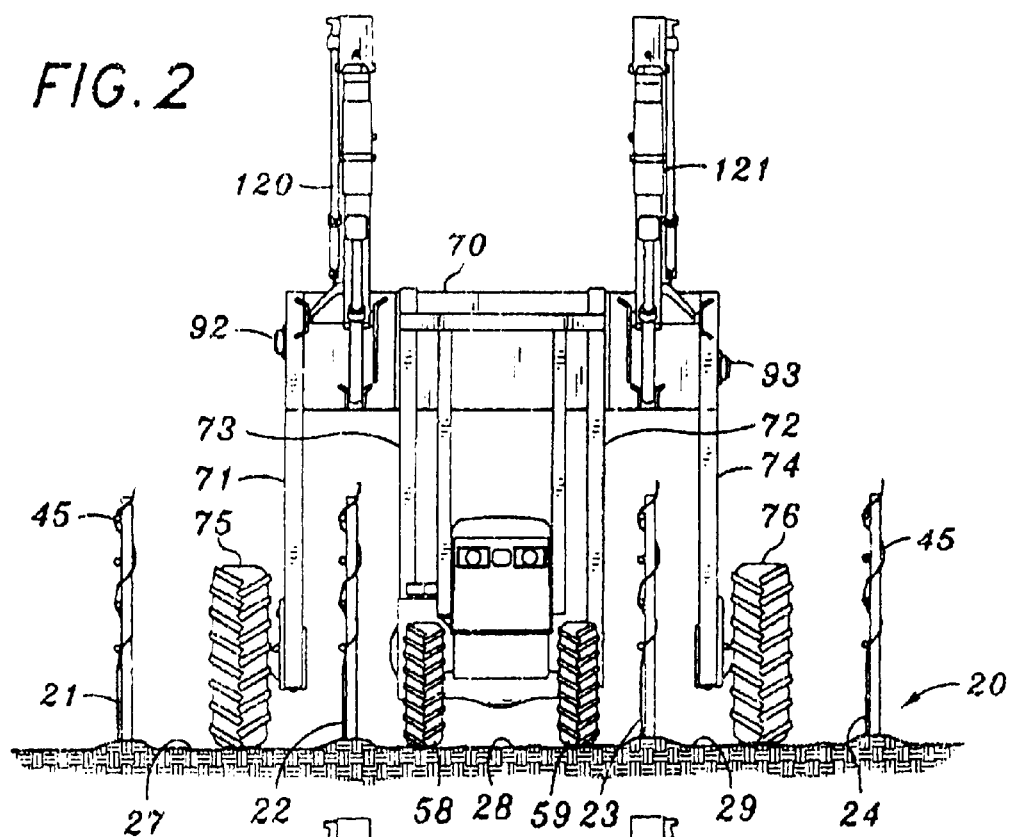
FIG. 2 is a front view of the tractor of FIG. 1.
Figure 3:
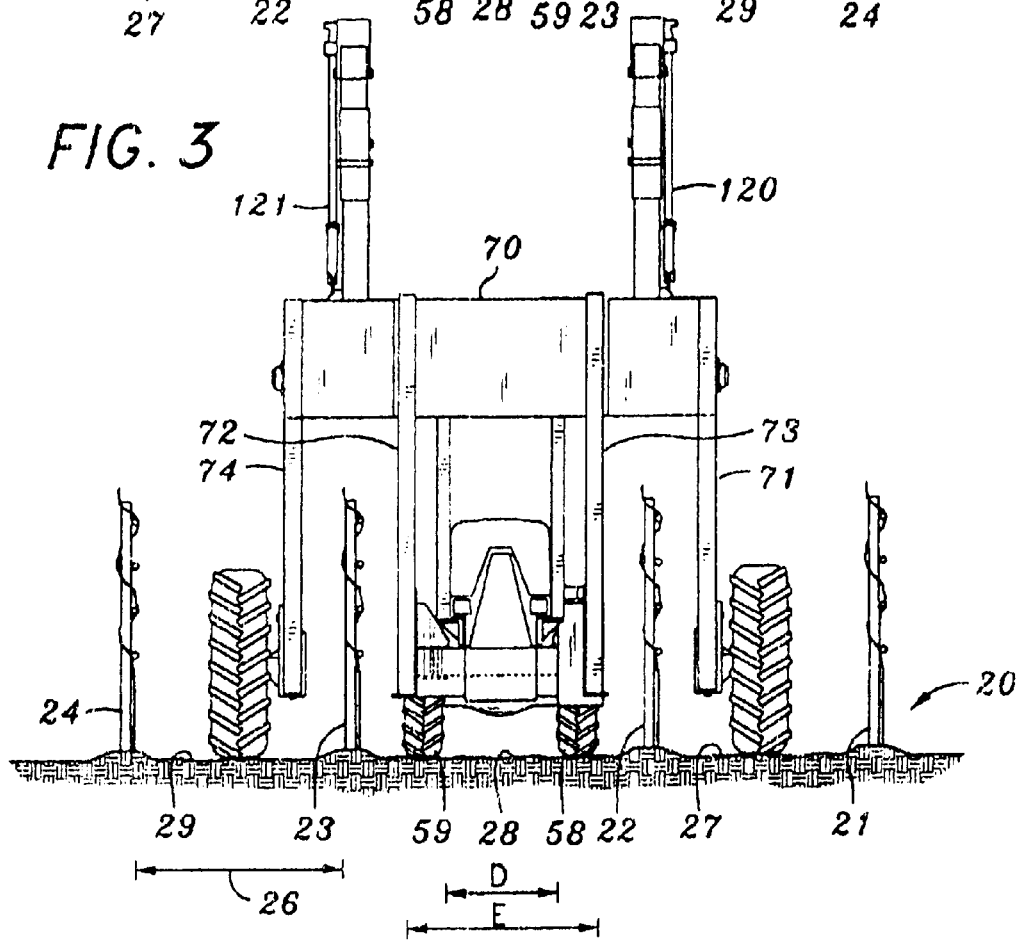
FIG. 3 is a rear view of said tractor.
Figure 4:
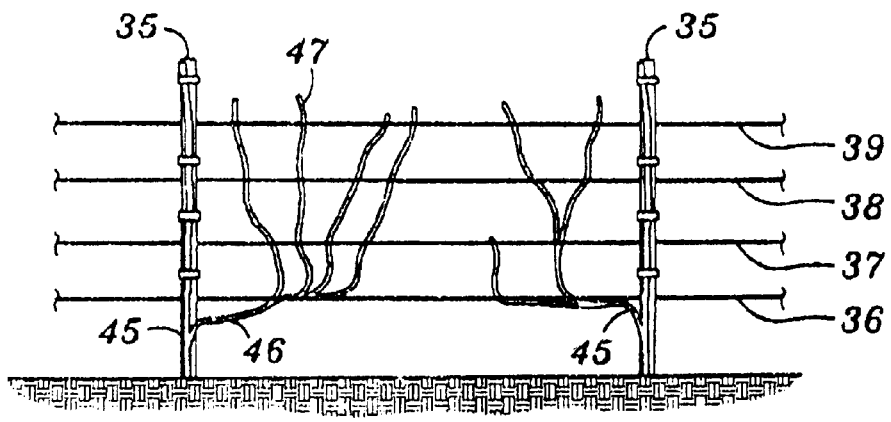
FIG. 4 is a schematic view of a trellis construction.
Figure 6:
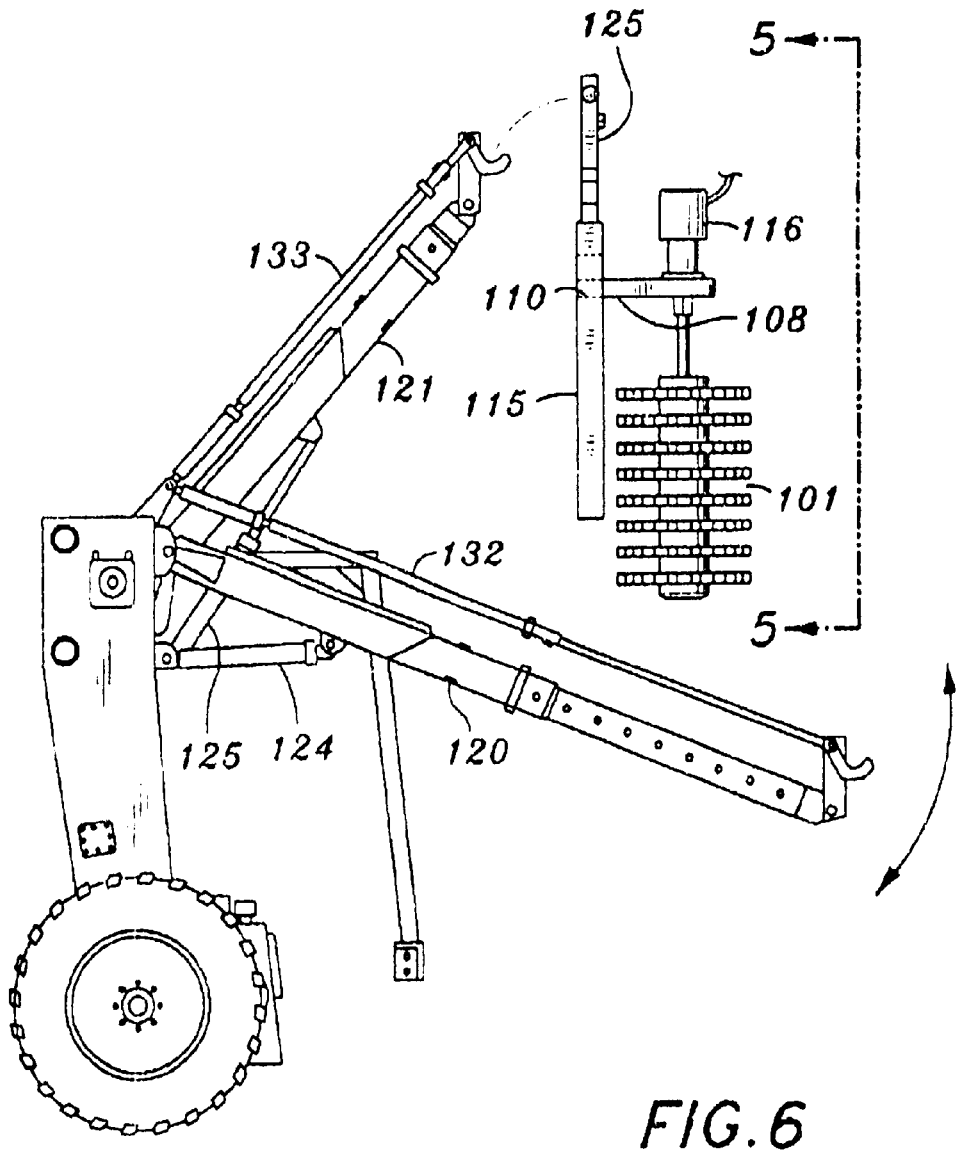
FIG. 6 is a side elevation showing a part of the invention, with the tool separated but ready for attachment.

FIGS. 2, 3 and 4 illustrate the scheme of a trellised vineyard 20. FIGS. 2 and 3 show four parallel adjacent rows 21, 22, 23, and 24 of trellised vines. These rows are spaced apart by some selected width 26. Respective paths 27, 28, and 29 extend between adjacent rows.

The apparatus of this invention is intended to pass along three of these paths while processing two rows adjacent to the apparatus. For example, the chassis of the apparatus may move along path 28 while processing rows 22 and 23. Its steering wheels, to be described later, will roll along central path 28, and its rear wheels will roll along adjacent paths 27 and 29.

The apparatus will be built so that its structure will not harm the rows. One or both sides of a row can be processed in a single pass. Alternatively, only one row can be processed at a time. In the event that only one row at a time will be processed, the unused tool for the other side will be disabled, often raised above the top of the row not being processed, or by removing one of the tools.

FIG. 4 schematically shows the environment in which the apparatus functions. A series of posts 35 is set upright in the ground. The posts are spaced apart by any suitable distance. Trellis wires 36, 37, 38, 39 are stretched between the posts. The wires are attached to the posts by any suitable fastener. One suitable fastener is a tang (not shown) integral with the post, and bent over the wire to hold it in place. The wires are spaced one above the other at any suitable spacing. About 12 inches vertical spacing is customary, but is arbitrary.

Vines 45 are planted beneath the wires, between the posts. As they grow, branches 46 and shoots 47 are formed. The shoots are selected and trained to the trellis. Each season the vine produces a substantial number of shoots, only a few of which will be needed and retained. The others must be pruned (cut-off) and discarded. It has been found to be a substantial economy each year to prune away growth above a given height before making the final selections and arrangements. Machinery of the type illustrated herein readily accomplishes this objective.

Shoots above some selected level, such as above wire 38 can be pruned away by this apparatus. This presents a substantial saving of labor. This invention provides means to attack both sides of each of two adjacent rows to remove excess growth. Other uses for apparatus of this type are crop-pickers, where instead of a cutting tool, a tool to pick a suitable crop such as grapes or tomatoes can be used.

Figure 1:
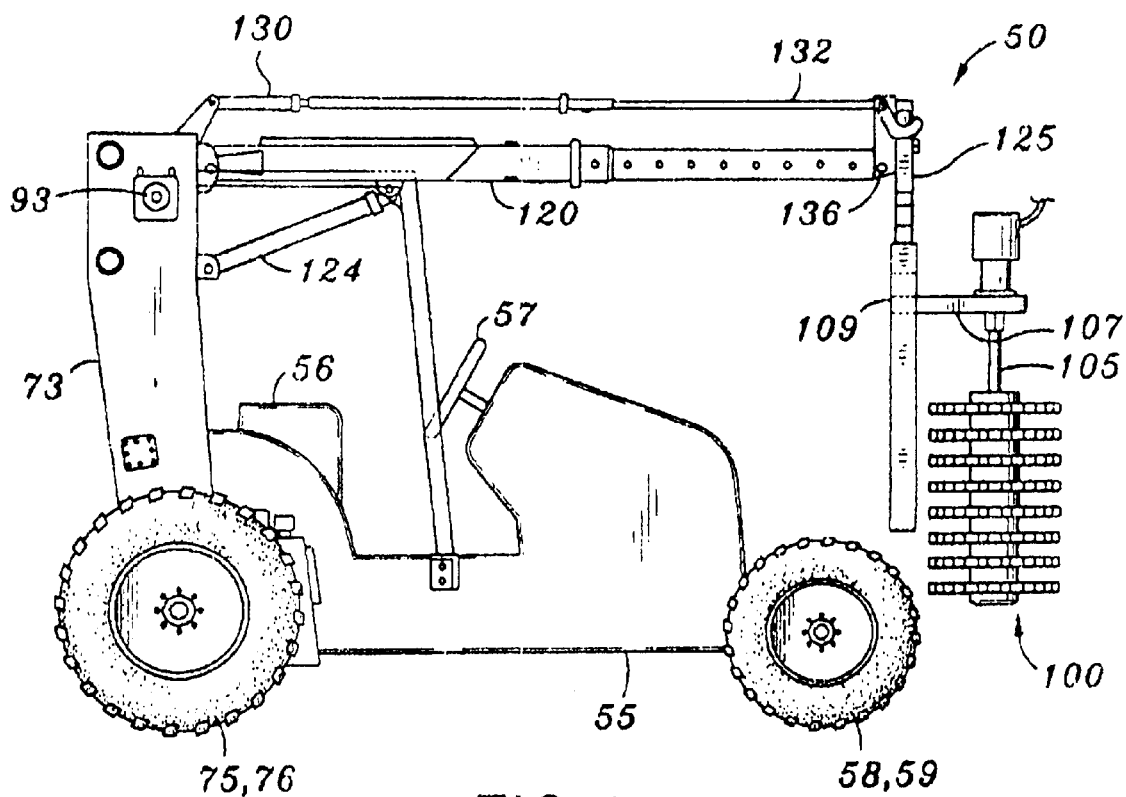
FIG. 1 is a side view of a tractor equipped with this invention.

As best shown in FIG. 1, apparatus 50 has a chassis 55. This chassis may be, and preferably will be, a major part of a conventional tractor. This usefulness of a standard tractor is one of the advantages of this invention.

The chassis includes a seat 56 for the driver and a conventional steering wheel 57. Steering wheel 57 sets the direction of two front steerable wheels 58, 59. These are steered, but are not necessarily powered. A power source (not shown) such as the conventional internal combustion engine provided with the tractor powers the apparatus under control of the driver.

Figure 7:
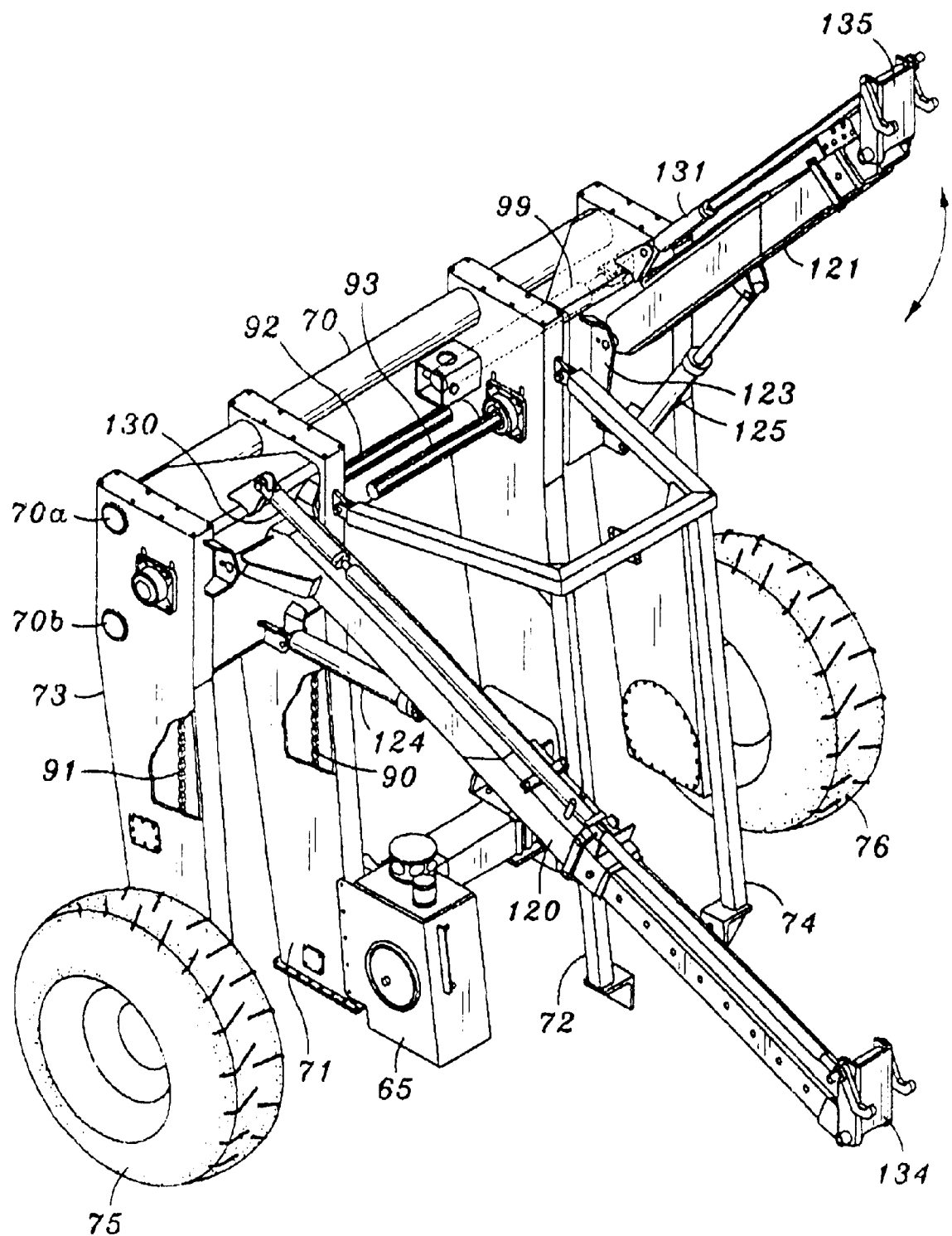
FIG. 7 is a perspective view, partly in exploded form, further showing parts of the invention.

A power take-off 65, schematically shown in FIG. 7, is driven by the engine. It utilizes the conventional engine controls and gear shifts to turn a rear axle for the ultimate purpose of moving the apparatus through a drive train yet to be described. The chassis has a lateral width D (FIG. 3), which is smaller than the spacing between the crops. The front wheels have a lateral spacing or first gauge E, which is no wider than the width of the path along which they roll.

A bridge 70 (see FIGS. 2, 3 and 7) is supported from the chassis by posts 71, 72. The posts are rigidly mounted to the chassis. The bridge is supported at a height sufficient to clear the tops of the rows that are adjacent to the chassis and overhang them. Struts 73, 74 depend from the bridge. Rear wheels 75, 76 are journaled by bearings to the lower ends of these struts. These wheels may be provided with brakes as appropriate.

A drive train extends from the power take-off 65 to each of the rear wheels. They are identical for each. The drive train is directly connected to the rear axle of the chassis so the same controls are used as would have been used for the rear wheels were they conventionally mounted. It will now be seen that the vehicle itself is supported on four wheels. The front set of wheels supports the front of the chassis, while the two rear wheels support the rear end. The rear wheels drive the apparatus. Importantly, both front wheels will roll along a central path, while the rear wheels run along different, adjacent paths, one on each side. The reader will notice the wide-gauge footprint of the rear wheels, which provides a very stable structure compared to a four wheel set in a single central path.

The drive train includes (for each side) an inboard chain drive 90 directly coupled by a sprocket (not shown) on the rear shaft at the lower end of posts 71, 72, and an outboard chain drive 91 coupled to a sprocket on a drive shaft (not shown) that drives the respective rear wheel.

Lateral connections between the inboard and outboard chain drives comprise horizontal splined shafts 92, 93 geared respectively to two upper chain drive sprockets (not shown). It will be noted that the outboard drives can slide laterally along the splined shafts. This splined arrangement enables the wheel gauge between the rear wheels to be adjusted when the width of the bridge is to be changed. The splined shafts act as power transfer shafts between the inboard and outboard chain drives, and are in effect idler shafts.

Bridge 70, 70a and a parallel tube 70b are attached to posts 71 and 72. Posts 71 and 72 are rigidly attached to the chassis. The central part of bridge 70 acts as a spacer between the posts. It, and a parallel companion tube the bridge and chassis thereby form a strong framework that resists forward and reverse tilting of the struts. The rear wheel gauge may be manually adjusted, and locked in position by any desired means. However, it may be preferred to provide a piston/cylinder assembly 99 between each post and strut to power the lateral movement of the strut. This is shown in exploded form for only one side. The other side is similarly equipped.

Tubes 70a and 70b are telescopic between the posts and struts. They thereby permit lateral movement of the struts, while resisting rotation of the struts.

Here it should be noted that the chain drive system is a very effective means to transfer power from the rear axle to the rear wheels. Rotary shafts with miter gears and the like could instead be used.

Thus, to this point there has been described a four-wheeled vehicle adapted to roll along three parallel and adjacent paths with a central chassis between them at a lower elevation, a bridge above the chassis which passes above the adjacent rows, and drive wheels below the bridge in the outer paths.

The purpose of the chassis and wheel support is to provide a maneuverable base for a pair of working tools 100, 101, one at each side of the chassis. Of course, if desired, only one tool need be used at any time if only one row is to be processed. It is an advantage of this invention that there can be either one in use, or two tool sets in simultaneous use, and that their two weights (whether both or only one is in use) will improve the stability of the apparatus because of their balance.

Figure 5:
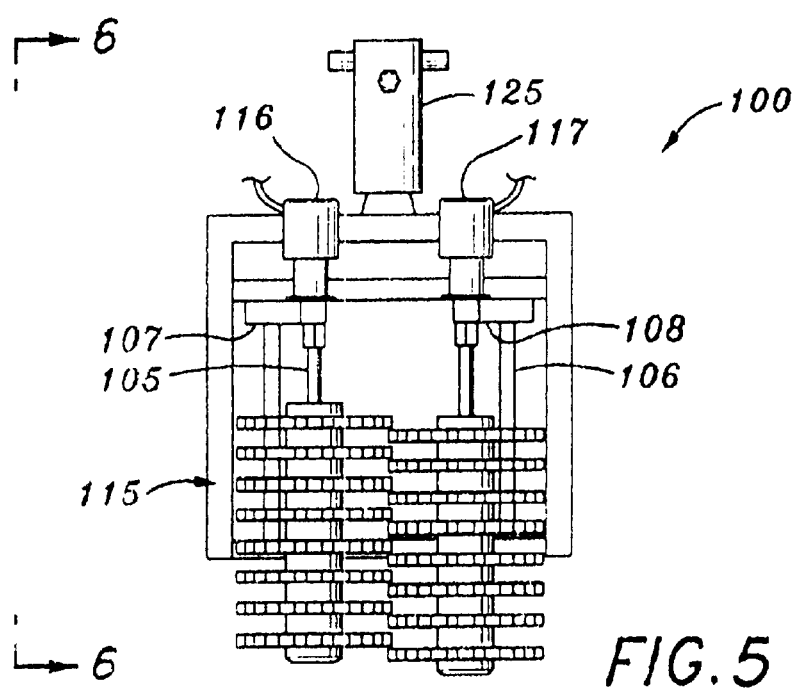
FIG. 5 is a side elevation of a pruner tool useful with this invention taken at line 5—5 in FIG. 6.

In the illustrations two working tools 100, 101, are shown. In this case they are pruners. Only one will be described in detail. The tools are usually identical, although they may be different if preferred. Tool 100 (FIG. 5) includes two driven shafts 105, 106, journaled to respective pivot arms 107, 108.

Pivot arms 107 and 108 are hinged at 109, 110 to a tilt yoke 115. Hydraulic motors 116, 117 carried by the pivot arms drive the respective tool shafts. Pivot arm motors 118, 119 are hinged to the tilt yoke and to the pivot arms to rotate the pivot arms so as to move the tools closer to, or farther away from one another. This will accommodate for various thicknesses of individual rows, and enable the tools to spread apart so as to clear an obstruction such as a post.

The tools themselves have suitable patterns of cutting teeth or picking fingers, suitable to the plants to be processed. The details of these tools are of no importance to this invention.

The term "motor" will frequently be used herein to define a piston-cylinder assembly in which movement of a piston rod mounted to one structure will move a cylinder mounted to the other structure so as to change the spacing between the ends of the motor. This change in length is used to rotate one element relative to another by reacting with an arm.

Crane arms 120, 121 are mounted to the bridge for vertical angular movement around horizontal journals 122, 123. Respective crane arm motors 124, 125 are hingedly mounted to the bridge and to the respective crane arm. These move the arms up and down. It will be observed that the spacing apart of the crane arms is adjustable only along with the struts and rear wheels. Journals 122 and 123 will usually overlay the rows.

Yoke necks 125 and 126 on the tilt yokes are journaled to the crane arms, spaced from the bridge, at pads 134 and 135. Yoke tilt motors 130, 131 include rods 132, 133, arranged in a parallelogram pattern with the crane arm. Changing the length of motors 130, 131 will tilt the tilt yoke relative to the respective crane arm. It will be observed that the yoke necks are at the pads respective of the parallelograms, and will tilt with them.

Yoke neck bearings 136, 137 are included in the yoke necks so the yokes can be rotated. Respective yoke motors 140, 141 between the lower portion of the yokes and the crane arm rotate the tilt frame.

It will now be seen that the working tools and the yoke necks are manipulable. The crane arms remain in their respective planes, but can travel up and down. The lateral spacing apart of the two yoke frames is adjustable only by adjusting the gauge of the rear wheels.

Bumpers 150, 151 extend beyond the outer periphery of the working elements of the tools, so as to encounter a post and deflect the tool before the tool elements strike the post.

Manipulable controls for the various piston/cylinder assemblies (frequently referred to him as "motors") are conventional and need not be shown in detail. A hydraulic pump supplies driving fluid under pressure to a selected side of the pistons, while the other side is vented in order to activate the motors. Classical protection devices such as pressure relief valves are included in the control system. These are known to persons skilled with hydraulic controls and require no description here.

This invention thereby discloses agricultural apparatus adapted to processing multiple crop rows at the two opposite side of each row, adjustable to various gauge widths, which is more stable and versatile than known apparatus of this general class.

The operation of this apparatus should be evident from the forgoing description. The gauge of the rear wheels is adjusted by moving the struts toward and away from one another. If desired, screws can be provided between the bridge and the struts. With the rear end jacked up, they can move the struts forward and away from the post. The splined shaft will enable this movement. Alternatively, a motor or other extension means may be interposed between the bridge and the struts for the same purpose, and to the same effect.

If desired, and depending on the actual dimensions, the rear wheels can be made to approach one another closely enough that the entire tractor can travel between two adjacent rows.

In operation, both crane arms can be operated with the same or different alignment so both tools can work on respective rows. Alternatively one can remain in operation, and the other lifted above the rows by its crane arm so it is out of the way.

While running along the rows, the tool will periodically encounter a post. For many tools this is not a problem. When it is, bumpers may strike the post and deflect the tools. Alternatively, the tool portions can be moved apart by their arms apart.

The tools must remain in some predetermined alignment relative to the vertical while working. This alignment occurs automatically when the crane arms are moved up and down because of the parallelogram arraignment of their mounts. Should a change in the angle be needed, then the yokes can be tilted.

This invention is not to be limited by the embodiment shown in the drawings and described in the description, which is given by way of example and not of limitation, but only in accordance with the scope of the appended claims.

I claim:

1. Apparatus enabling the simultaneous processing of two parallel rows of plants, each of said rows having two sides and a height, there being a central path between said rows, and an outer path on the other side of each row, said apparatus comprising:
    a chassis having an engine, a power take off from said engine, a rear drive shaft driven by said engine originally intended to drive rear wheels, and two steerable front wheels, said chassis having a width narrower than the spacing between the adjacent rows, said front wheels having a lateral first gauge no wider than the central path;
    two laterally spaced apart upright posts mounted on said chassis toward the rear thereof;
    a bridge mounted to said posts between said posts at an elevation above the height of the rows and extending laterally beyond the posts at each side;
    a pair of struts depending from said bridge, one at each side of said chassis at a lateral spacing apart so as to overhang the outer paths when the chassis is in the center path;
    a rear wheel drivingly mounted to the lower end of each of said struts spaced at a lateral second gauge from each other;
    a power train extending from said power take-off, through the posts, bridge, and struts to said rear wheels, said power take-off being powered by said engine and controllable by an operator to drive the tractor;
    a pair of forwardly-extending laterally spaced apart crane arms journaled to said bridge for upward and downward rotation;
    a crane arm motor to rotate each of said crane arms;
    a yoke hingedly mounted to each crane arm spaced from said bridge for tilting movement in the plane of each said arm;
    a yoke tilting motor between said each crane arm and each said yoke;
    a pair of pivot arms on each yoke, one on each side;
    tool mounts on each pivot arm to mount a respective rotatable tool and tool drive motor, said pivot arms being so disposed and arranged that a tool mounted to the respective pivot arms may adjustably be moved relative to the yoke to enable a tool carried by them to approach or withdraw from a trellis which the yoke straddles;
    a pivot arm motor respective to each pivot arm between said yoke and said pivot arm to move said pivot arm;
    a power supply providing energy for the motors; and
    controls respective to each said motor for manipulation by an operator.

2. Apparatus according to claim 1 in which said power train comprises a transfer shaft rotatably journaled between each post and its respective strut, a respective first chain drive linking said drive shaft and said transfer shaft on each side of said chassis; a respective second chain drive linking said transfer shaft and each rear wheel, whereby driving the drive shaft will drive the rear wheels through said chain drives in the same sense as the wheels could have been driven had they been mounted to the drive shaft.

3. Apparatus according to claim 1 in which the spacing between said struts, and thereby the spacing between the rear wheels is adjustable.

4. Apparatus according to claim 3 in which said power train comprises a transfer shaft rotatably journaled between each post and its respective strut, a respective first chain drive linking said drive shaft and said transfer shaft on each side of said chassis; a respective second chain drive linking said transfer shaft and each rear wheel, whereby driving the drive shaft will drive the rear wheels through said chain drives in the same sense as the wheels could have been driven had they been mounted to the drive shaft.

5. Apparatus according to claim 4 in which said transfer shaft is axially splined, and at least one of said chain drives is spline-connected to it so as to permit lateral movement of the respective strut.

6. Apparatus according to claim 5 in which said chain drives includes sprockets engaged to chains for transferring power from one end of each chain drive to the other.

7. Apparatus according to claim 3 in which at each side of the bridge, a pair or concentric tubular cantilevered beams overlap to resist rotation of the struts relative to the posts, and to enable the spacing between the struts to be adjusted.

8. Apparatus according to claim 3 in which a linear motor is interposed between each strut and its respective post to adjust the spacing of the post from the chassis.

9. Apparatus according to claim 3 in which each said crane arm moves laterally with its respective strut.

10. Apparatus according to claim 1 in which a portion of a said tool is mounted to each of said tool mounts whereby cooperatively to process a portion of a row of plants disposed between them.

11. Apparatus according to claim 10 in which said portions of said tool together comprise a pruner.

12. Apparatus according to claim 11 in which said power train comprises a transfer shaft rotatably journaled between each post and its respective strut, a respective first chain drive linking said drive shaft and said transfer shaft on each side of said chassis; a respective second chain drive linking said transfer shaft and each rear wheel, whereby driving the drive shaft will drive the rear wheels through said chain drives in the same sense as the wheels could have been driven had they been mounted to the drive shaft.

13. Apparatus according to claim 12 in which the spacing between said struts, and thereby the spacing between the rear wheels is adjustable.

14. Apparatus according to claim 13 in which a linear motor is interposed between each strut and its respective post to adjust the spacing of the posts from the chassis.

15. Apparatus according to claim 14 in which each said crane arm moves laterally with its respective strut.

\* \* \* \* \*